United States Patent Office 2,839,496
Patented June 17, 1958

2,839,496

EPOXIDE RESINS AND 1,4,5,6,7,7 HEXACHLORO 2-(2,3-EPOXYPROPOXYMETHYL) BICYCLO (2.2.1) HEPT-5-ENE

Wilbur L. Bressler and John C. Smith, Lake Jackson, Tex., assignors to The Dow Chemical Company, Midland, Mich., a corporation of Delaware No Drawing. Application June 4, 1956
Serial No. 588,981

12 Claims. (Cl. 260—47)

This invention relates to new epoxide compositions and to a method of imparting non-combustible properties to epoxide compositions which comprises intermixing 1,4,5,6,7,7 - hexachloro - 2 - (2,3 - epoxypropoxymethyl)-bicyclo(2.2.1)hept-5-ene as a reactive diluent with epoxide condensation products.

Epoxide condensation products are well known and may be produced by reaction of a dihydric phenol, such as p,p'-isopropylidenediphenol and a chlorohydrin, such as epichlorohydrin, with aqueous alkali. The condensation products are capable of further polymerization in the presence of catalysts or by reacting the products with cross-linking reactants, such as amides, polyamides, isocyanate, and polyamines. Depending upon the degree of polymerization, a wide variety of valuable products can be obtained varying from soft resins to hard infusible solids. Thus, these condensation products may be used in manufacture of varnishes, molding compositions, adhesives and films. Some of the epoxide condensation products are highly viscous. In using these products in molding or in the production of films, the epoxide products are difficult to handle due to theid viscosity. They will not only adhere to the equipment, but when a catalyst or a cross-linking reactant is mixed into the product, air which becomes entrapped is difficult to remove so that defective moldings or films are often made. A less viscous material would greatly aid in the manufacturing of materials from the epoxide condensation products. Furthermore, the epoxide condensation products and the polymerized resins are combustible. Thus, the use of these compositions is greatly limited.

It is, therefore, the principal object of this invention to provide compositions of matter with properties similar to the epoxide condensation compositions, but which have a lower viscosity in the unpolymerized state. A further object is to provide a method for imparting non-combustible properties to epoxide compositions and to provide compositions of matter which have non-combustible properties.

The above and other objects may be accomplished by the invention which comprises intimately incorporating 1,4,5,6,7,7 - hexachloro - 2 - (2,3 - epoxypropoxymethyl)bicyclo(2.2.1)hept-5-ene with epoxide resin compositions resulting from the reaction of p,p'-isopropylidenediphenol and epichlorohydrin with caustic. Many of the new unpolymerized compositions have a viscosity of around 25 stokes as compared to the epoxide condensation products of around 125 stokes. This decrease in viscosity aids in the removal of entrapped air. The properties of the new composition are not greatly changed and can be used to replace the epoxide condensation products for most of the articles made with these resins. The non-combustible characteristics of these new compositions greatly increase the possible use of these compositions.

These new compositions possessing the low viscosity and non-combustible properties are obtained by intermixing 1,4,5,6,7,7 - hexachloro - 2 - (2,3 - epoxypropoxymethyl)bicyclo(2.2.1)hept-5-ene, which is described in detail in copending application of instant inventors, Serial No. 588,982, filed on the same date as instant application, as a reactive diluent with epoxide condensation products. In obtaining these new compositions, it is preferred to use epoxide condensation resins obtained by reacting p,p'-isopropylidenediphenol and the epichlorohydrin in a molar ratio of p,p'-isopropylidenediphenol to epichlorohydrin in the range of 1:5 to 1:10. To impart the non-combustible characteristics to the new resins at least about 25 weight percent of the reactive diluent must be used. Where the new compositions are to be used to replace the hard epoxide resins, it is preferred not to use more than 50 weight percent of this reactive diluent since the addition of the diluent will somewhat lower the hardness of the resins. Where a softer resin can be tolerated an amount of the diluent as high as 75 percent may be used.

The catalysts or the cross-linking reactants which are employed for the further polymerization of the epoxide condensation compositions may be also used for the new compositions to produce infusible solid resins. The amount of catalyst or of the cross-linking reactant employed and the temperature used for the polymerization are likewise the same as for the epoxide resins. The polymerization temperatures employed may be from room temperature to 150° C. The rate of polymerization increases with temperature so that at a higher temperature a shorter polymerization time is required. For the new compositions, ethylene diamine and triethylene tetramine in an amount equal to 5 to 15 weight percent of the new compositions are usually used as cross-linking reactants. It is preferred to use a polymerization temperature in the range of 120° to 140° C. At these temperatures the compositions will polymerize to hard and infusible resins in about 20 to 40 minutes.

The following example further illustrates the invention:

Example I

A mixture was prepared containing 50 parts by weight of 1,4,5,6,7,7 - hexachloro - 2 - (2,3 - epoxypropoxymethyl)bicyclo(2.2.1)hept-5-ene and 50 parts by weight of a p,p'-isopropylidenediphenol-epichlorohydrin condensation product which was obtained by reacting 1 mole of p,p'-isopropylidenediphenol with 10 moles of epichlorohydrin and 1.02 moles of caustic. The p,p'-isopropylidenediphenol used was similar to the product sold by The Dow Chemical Company under the trade name "Bisphenol A." The viscosity of this mixture was 25 stokes and was determined by a bubble viscosimeter. This mixture was set or cured by adding 10 percent by weight of diethylene triamine and heating the mixture at 130° C. for 30 minutes.

The properties of the resin containing 1,4,5,6,7,7-hexachloro - 2 - (2,3 - epoxypropoxymethyl)bicyclo(2.2.1)-hept-5-ene prepared as described above are shown below compared to the properties of the resins prepared in the same manner but without the reactive diluent.

| | Epoxy Resins | |
|---|---|---|
| | Without Reactive Diluent | With Reactive Diluent |
| Viscosity of mixture prior to setting. | 125–150 stokes | 25 stokes. |
| Rockwell Hardness | M 100 | M 88. |
| Izod Impact Strength | 0.36 ft.-lb. per inch of notch. | 0.58 ft.-lb. per inch of notch. |
| Flammability | Supports combustion. | Self-extinguishing. |

What is claimed is:

1. A resinous composition, which comprises from 25 to 75 weight percent 1,4,5,6,7,7-hexachloro-2-(2,3-epoxypropoxymethyl)bicyclo(2.2.1)hept-5-ene intimately incorporated with 25 to 75 weight percent of an epoxide resin composition resulting from the reaction of p,p'-isopropylidenediphenol and epichlorohydrin with caustic.

2. A resinous composition, which comprises from 25 to 75 weight percent 1,4,5,6,7,7-hexachloro-2-(2,3-epoxypropoxymethyl)bicyclo(2.2.1)hept-5-ene intimately incorporated with 25 to 75 weight percent of an epoxide resin composition resulting from the reaction of p,p'-isopropylidenediphenol and epichlorohydrin with caustic where the molar ratio of p,p'-isopropylidenediphenol to epichlorohydrin is in the range of 1:5 to 1:10.

3. A resinous composition, which comprises from 45 to 55 weight percent of 1,4,5,6,7,7-hexachloro-2-(2,3-epoxypropoxymethyl)bicyclo(2.2.1)hept - 5 - ene intimately incorporated with 45 to 55 weight percent of an epoxide resin composition resulting from the reaction of p,p'-isopropylidenediphenol and epichlorohydrin with caustic where the molar ratio of p,p'-isopropylidenediphenol to epichlorohydrin is 1:10.

4. An infusible resinous composition formed by the reaction of a cross-linking amine selected from the group consisting of ethylene diamine and triethylene tetramine with a mixture containing from 25 to 75 weight percent 1,4,5,6,7,7 - hexachloro - 2 - (2,3 - epoxypropoxymethyl)- bicyclo(2.2.1)hept - 5 - ene and from 25 to 75 weight percent of an epoxide resin composition resulting from the reaction of p,p'-isopropylidenediphenol and epichlorohydrin with caustic.

5. An infusible resinous composition formed by the reaction of ethylene diamine in an amount equal to 5 to 15 weight percent of the reaction mass and at a temperature in the range of 120° to 140° C. with a mixture containing from 25 to 75 weight percent 1,4,5,6,7,7-hexachloro - 2 - (2,3 - epoxypropoxymethyl)bicyclo(2.2.1)- hept - 5 - ene and from 25 to 75 weight percent of an epoxide resin composition resulting from the reaction of p,p'-isopropylidenediphenol and epichlorohydrin with caustic.

6. An infusible resinous composition formed by the reaction of a cross-linking amine selected from the group consisting of ethylene diamine and triethylene tetramine with a mixture containing from 25 to 75 weight percent 1,4,5,6,7,7 - hexachloro - 2 - (2,3 - epoxypropoxymethyl)- bicyclo(2.2.1)hept - 5 - ene and from 25 to 75 weight percent of an epoxide resin composition resulting from the reaction of p,p'-isopropylidenediphenol and epichlorohydrin with caustic where the molar ratio of p,p'-isopropylidenediphenol to epichlorohydrin is in the range of 1:5 to 1:10.

7. An infusible resinous composition formed by the reaction of ethylene diamine in an amount equal to 5 to 15 weight percent of the reaction mass and at a temperature in the range of 120° to 140° C. with a mixture containing from 25 to 75 weight percent 1,4,5,6,7,7 - hexachloro - 2 - (2,3 - epoxypropoxymethyl)bicyclo(2.2.1)- hept - 5 - ene and from 25 to 75 weight percent of an epoxide resin composition resulting from the reaction of p,p'-isopropylidenediphenol and epichlorohydrin with caustic where the molar ratio of p,p'-isopropylidenediphenol to epichlorohydrin is in the range of 1:5 to 1:10.

8. An infusible resinous composition formed by the reaction of a cross-linking amine selected from the group consisting of ethylene diamine and triethylene tetramine with a mixture containing from 45 to 55 weight percent of 1,4,5,6,7,7 - hexachloro - 2 - (2,3 - epoxypropoxymethyl)bicyclo(2.2.1)hept - 5 - ene and from 45 to 55 weight percent of an epoxide resin composition resulting from the reaction of p,p'-isopropylidenediphenol and epichlorohydrin with caustic where the molar ratio of p,p'-isopropylidenediphenol to epichlorohydrin is 1:10.

9. An infusible resinous composition formed by the reaction of ethylene diamine in an amount equal to 5 to 15 weight percent of the reaction mass and at a temperature in the range of 120° to 140° C. with a mixture containing from 45 to 55 weight percent of 1,4,5,6,7,7- hexachloro - 2 - (2,3 - epoxypropoxymethyl)bicyclo- (2.2.1)hept - 5 - ene and from 45 to 55 weight percent of an epoxide resin composition resulting from the reaction of p,p'-isopropylidenediphenol and epichlorohydrin with caustic where the molar ratio of p,p'-isopropylidenediphenol to epichlorohydrin is 1:10.

10. A method of imparting non-combustible properties to epoxide resins resulting from the reaction of p,p'-isopropylidenediphenol and epichlorohydrin with caustic, which comprises intermixing 1,4,5,6,7,7 - hexyachloro- 2 - (2,3 - epoxypropoxymethyl)bicyclo(2.2.1)hept - 5- ene with the epoxide resin in amount such that the mixture will contain from 25 to 75 weight percent of 1,4,5,6,7,7 - hexachloro - 2 - (2,3 - epoxypropoxymethyl)- bicyclo(2.2.1)hept - 5 - ene.

11. A method for imparting non-combustible properties to epoxide resins resulting from the reaction of p,p'-isopropylidenediphenol and epichlorohydrin with caustic where the molar ratio of p,p'-isopropylidenediphenol to epichlorohydrin is in the range of 1:15 to 1:10, which comprises intermixing 1,4,5,6,7,7 - hexachloro - 2 - (2,3- epoxypropoxymethyl)bicyclo(2.2.1)hept - 5 - ene with the epoxide resin in amount such that the mixture will contain from 25 to 75 weight percent of 1,4,5,6,7,7 - hexachloro - 2 - (2,3 - epoxypropoxymethyl)bicyclo(2.2.1)- hept-5-ene.

12. A method for imparting non-combustible properties to epoxide resins resulting from the reaction of p,p'-isopropylidenediphenol and epichlorohydrin with caustic where the molar ratio of p,p'-isopropylidenediphenol to epichlorohydrin is 1:10, which comprises intermixing 1,4,5,6,7,7 - hexachloro - 2 - (2,3 - epoxypropoxymethyl)- bicyclo(2.2.1)hept - 5 - ene with the epoxide resin in amount such that the mixture will contain from 45 to 50 weight percent 1,4,5,6,7,7 - hexachloro - 2 - (2,3 - epoxypropoxymethyl)bicyclo(2.2.1)hept-5-ene.

References Cited in the file of this patent

UNITED STATES PATENTS 2,744,845     Rudoff _____ May 8, 1956